(12) United States Patent
Arends

(10) Patent No.: US 7,399,175 B2
(45) Date of Patent: Jul. 15, 2008

(54) THERMOFORMER PLUG ASSIST DRIVE ASSEMBLY

(75) Inventor: Albert W. Arends, Gladwin, MI (US)

(73) Assignee: Brown Machine, LLC, Beaverton, MI (US)

( * ) Notice: Subject to any disclaimer, the term of this patent is extended or adjusted under 35 U.S.C. 154(b) by 228 days.

(21) Appl. No.: 11/352,933

(22) Filed: Feb. 13, 2006

(65) Prior Publication Data

US 2007/0190199 A1 Aug. 16, 2007

(51) Int. Cl.
*B28B 13/00* (2006.01)
(52) U.S. Cl. .................. 425/395; 425/292; 425/403
(58) Field of Classification Search ................ 425/292, 425/395, 403
See application file for complete search history.

(56) References Cited

U.S. PATENT DOCUMENTS

| | | | | |
|---|---|---|---|---|
| 4,099,901 A | * | 7/1978 | Shuman | 425/388 |
| 6,314,873 B1 | * | 11/2001 | Lee et al. | 100/35 |
| 6,648,624 B1 | * | 11/2003 | Foor et al. | 425/302.1 |
| 2006/0068048 A1 | * | 3/2006 | Koda et al. | 425/3 |

* cited by examiner

*Primary Examiner*—Yogendra Gupta
*Assistant Examiner*—Maria Veronica D Ewald
(74) *Attorney, Agent, or Firm*—John R. Benefiel

(57) ABSTRACT

A plug assist drive assembly for driving plug assists in a thermoforming apparatus includes a single centrally located roller screw assembly enclosed in a housing and driving a third platen mounting the plug assist with a group of guide-drive bars connected to a drive platen which is driven by the roller screw nut. The roller screw assembly is removable by removing screws holding the nut to one hub adapter, the screws accessed through an opening in the housing normally covered with a plate.

10 Claims, 5 Drawing Sheets

THERMOFORMER PLUG ASSIST DRIVE ASSEMBLY

BACKGROUND OF THE INVENTION

This invention concerns thermoforming apparatus and more particularly drive mechanisms for advancing plug assists into mold cavities as an aid in stretching the material into conformity with the mold cavity walls.

In this technique, an array of plugs are moved on a "third" platen very quickly into the mold cavities during the forming cycle, i.e., completing the movement within one quarter of a second is typical.

In order to accomplish this, in the past, a set of four ball screws was arranged well outside the center of the machine which collectively drove a large plate to which were affixed a series of pusher shafts which in turn were coupled to a tooling third platen on which an array of plugs were mounted.

The use of a plurality of ball screws necessitated an arrangement of drive belts or other means interconnecting the ball screws to synchronize their rotation to maintain the proper orientation of the tooling platen. An overly complex assembly resulted and notwithstanding the interconnection, the ball screws were difficult to keep in perfect synchronization. The platen was of necessity quite large to accommodate the four ball screws, and needed to be guided in linear bearings engaging the outer sides of the platen.

Also, the large size of this assembly precluded any protective enclosure of the components, allowing dirt to enter and lubricant to escape from these components.

It is the object of the present invention to provide a plug assist drive of the type described which is much simpler and more compact to allow an enclosure of the components.

It is a further object of the present invention to provide such a plug assist drive which has fewer components which are more compactly arranged and which is easy to disassemble.

SUMMARY OF THE INVENTION

The above objects and other objects which will be understood upon reading the following specification and claims are achieved by a plug drive which includes a smaller sized drive platen driven by a single centrally located roller screw mounted within an enclosing housing.

The roller screw drive is supported on a housing bottom plate, the roller screw shaft supported by a set of bearings mounted within a bearing housing affixed to the underside of a bottom plate. An upper bearing mounted in a housing top plate supports the upper end of the screw shaft.

The drive platen is connected at its outer perimeter to a set of combination guide and drive rods which are each supported in two bearing sets, one mounted to the bottom plate and another to the top plate respectively.

The upper end of the guide-drive rods are connected to a third platen mounting the plug assists by quick connect couplings.

The roller screw shaft has a protruding lower end which has a sheave mounted thereon receiving a belt driven by a servomotor driven sheave.

The upper end of the roller screw nut is held abutting an adapter hub affixed to the drive platen to drive the platen up or down when the screw shaft is rotated by operation of the servo motor.

Upon removal of the hub attachment screws, the entire roller screw assembly and bearings can be removed by being lowered through an opening in the housing bottom plate.

The housing encloses the roller screw assembly and guide bars to prevent the entrance of dirt and the escape of lubricant.

The guide-drive bars are clamped to the drive platen between pairs of blocks attached with screws to the guide bars to be held straddling and gripping the drive platen to provide accurate guidance during driving of the platen and the tooling plate to eliminate the need for guidance of the platen itself as with the linear bearings formerly used.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
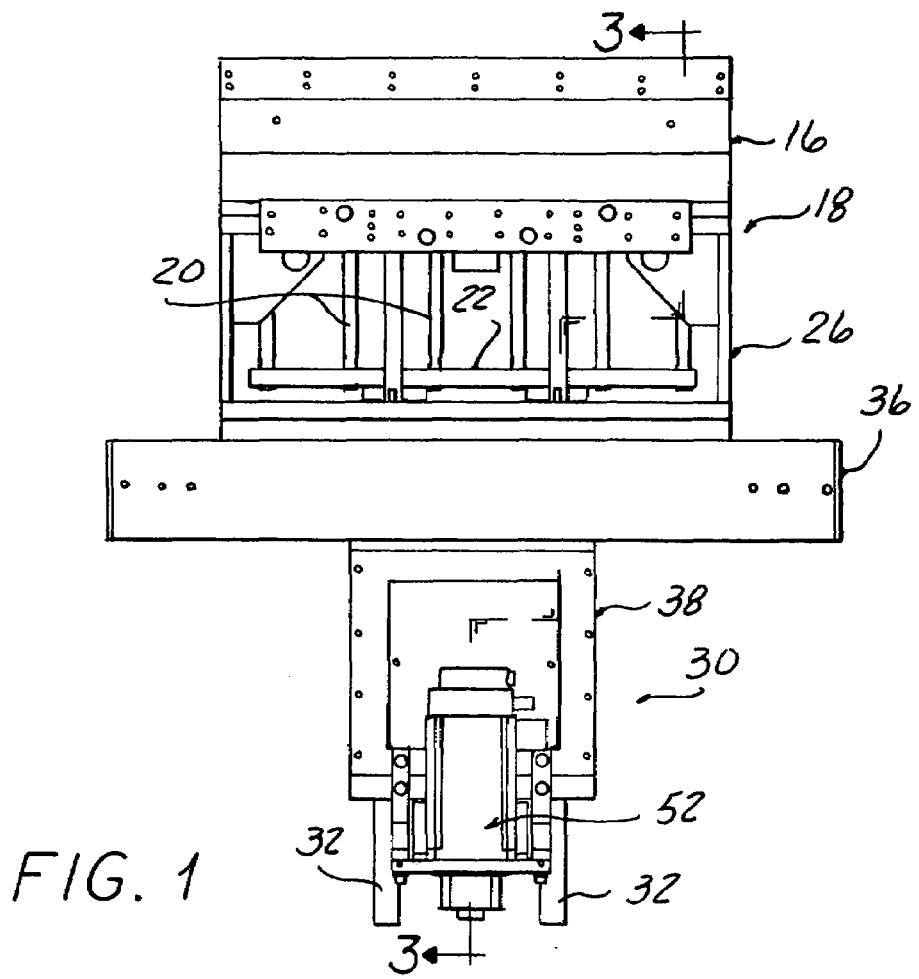
FIG. 1 is an elevational view of a plug assist tooling assembly, a thermoformer press platen, and a plug assist drive assembly according to the present invention coupled thereto.
Figure 2:
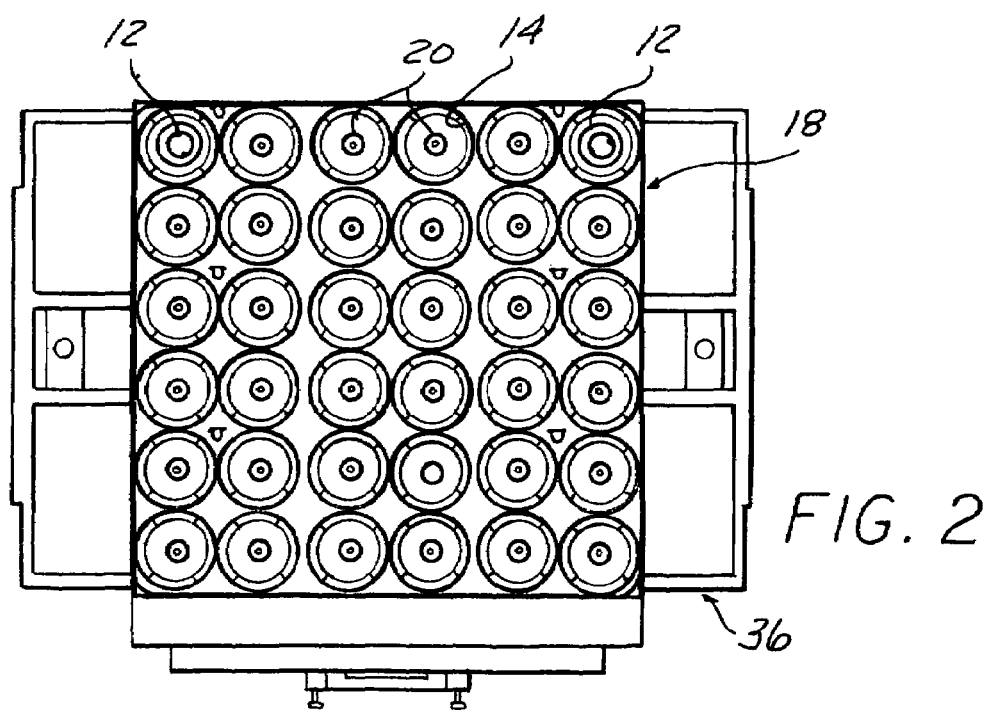
FIG. 2 is a top view of the plug assist tooling shown in FIG. 1.
Figure 4:
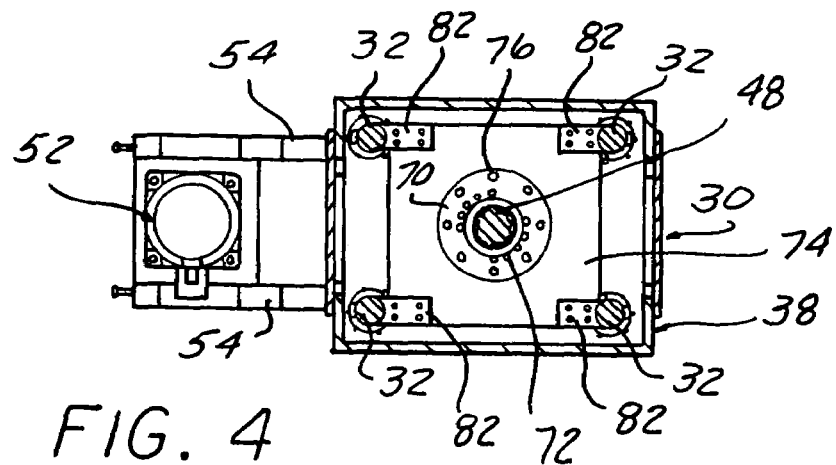
FIG. 4 is a view of the section 4-4 taken in FIG. 3.
Figure 3:
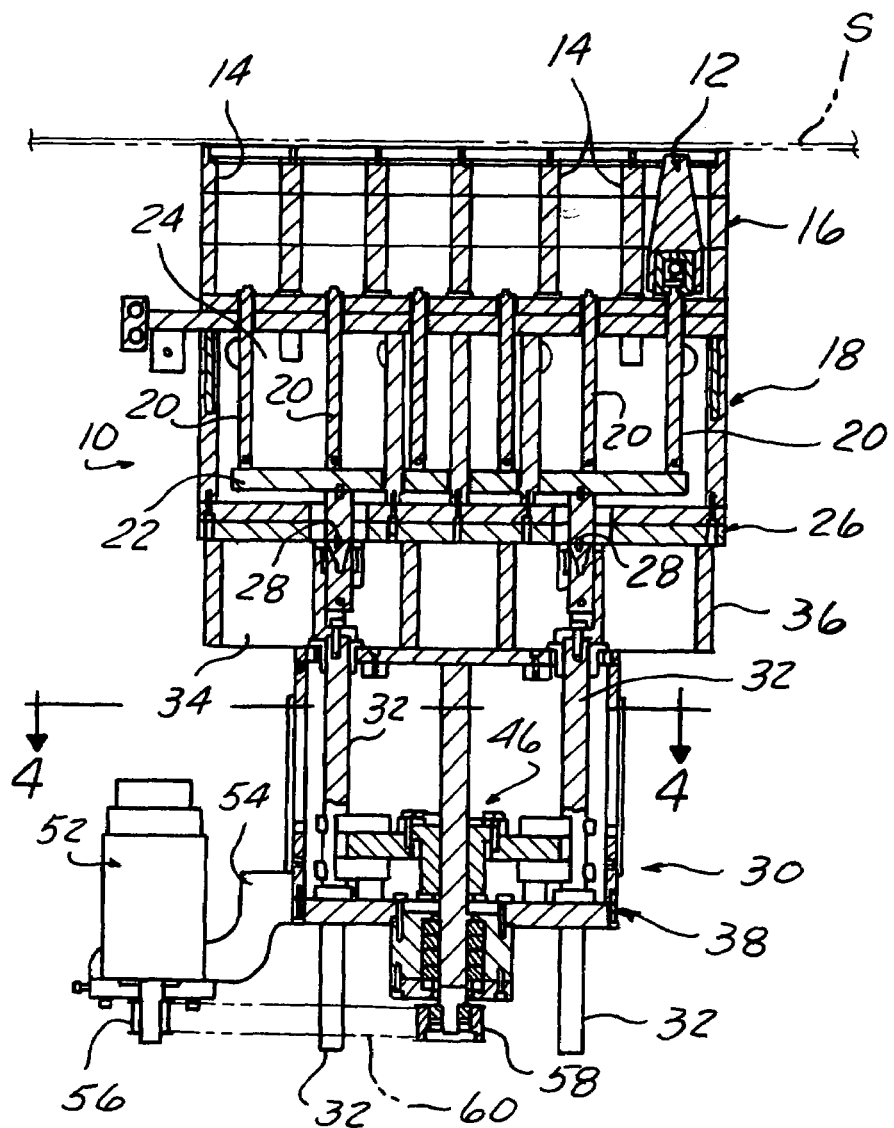
FIG. 3 is a view of the section 3-3 taken in FIG. 1.
Figure 6:
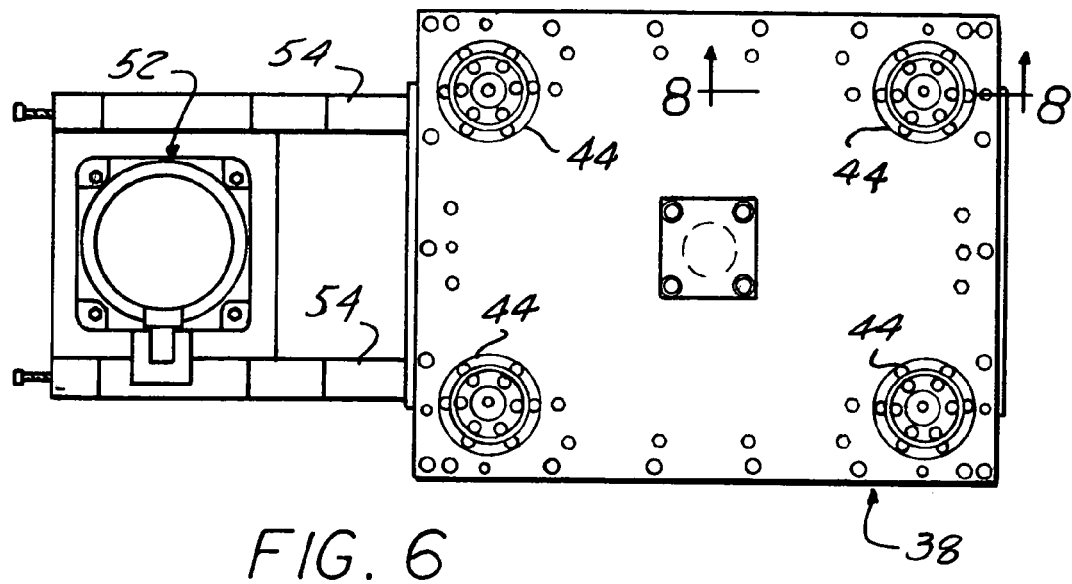
FIG. 6 is a top view of the plug assist drive shown in FIG. 5.
Figure 5:
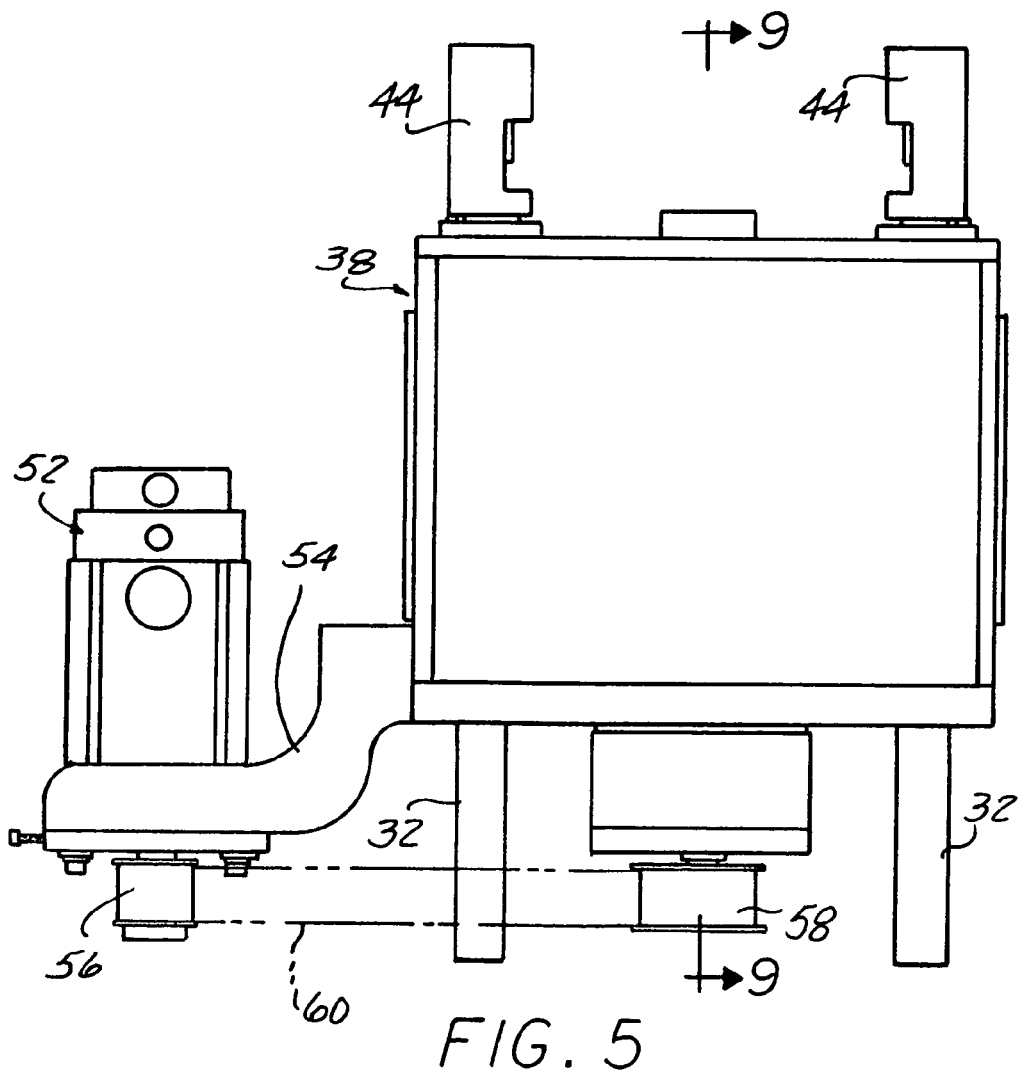
FIG. 5 is an enlarged side view of the plug assist drive according to the invention shown in FIGS. 1-4.
Figure 7:
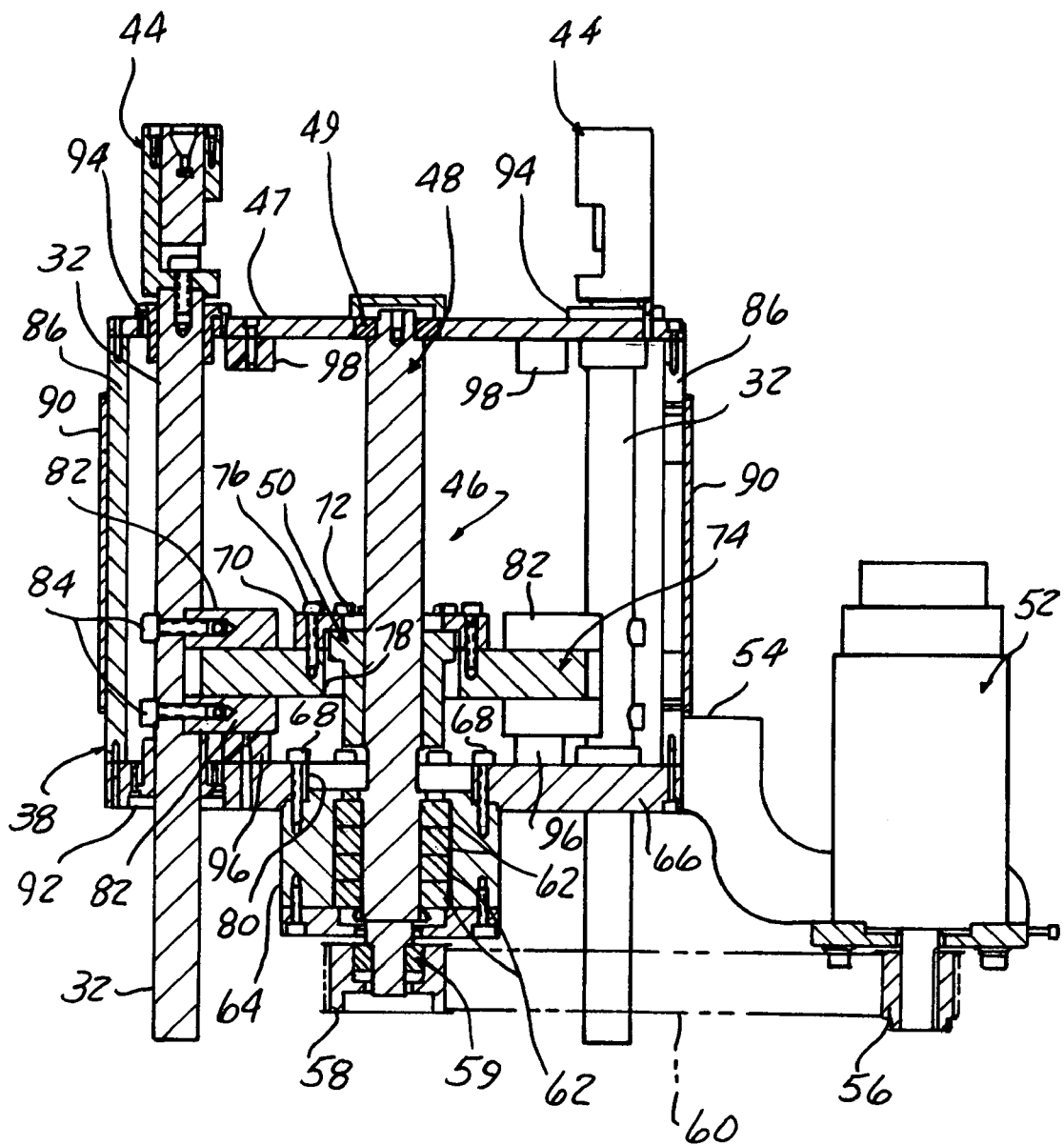
FIG. 7 is a reversed enlarged view of the section of the plug-assist drive assembly shown in FIG. 3.
Figure 9:
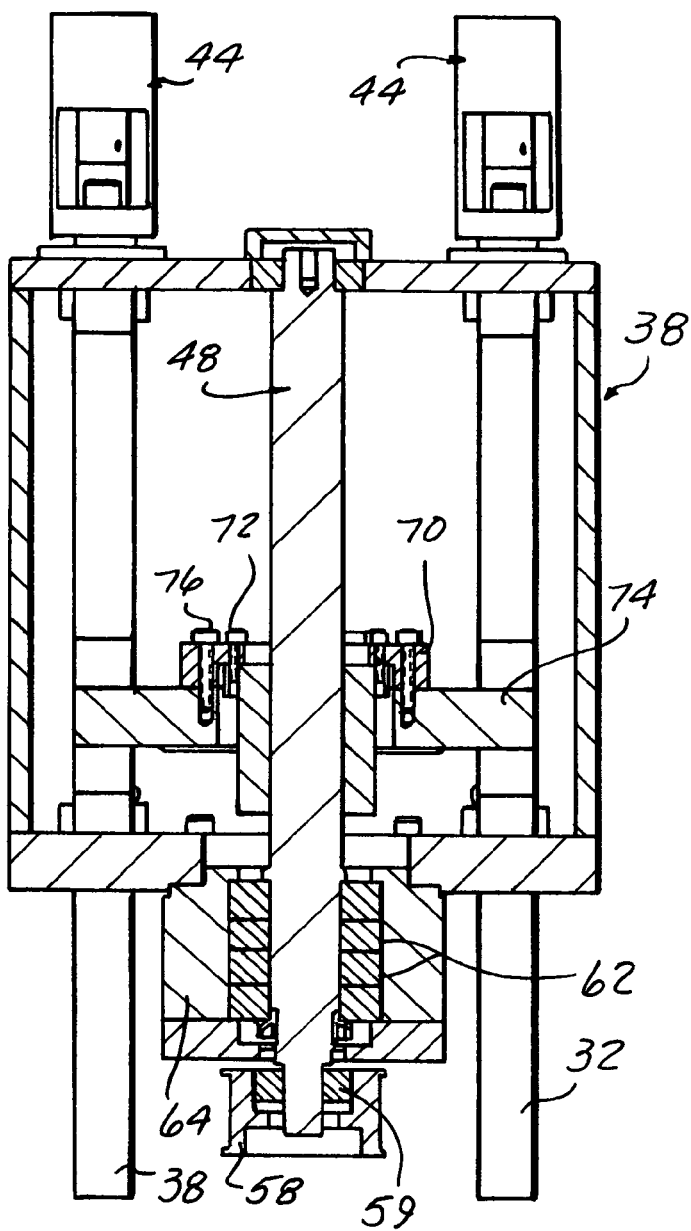
FIG. 9 is a view of the section 9-9 taken in FIG. 5.
Figure 9A:
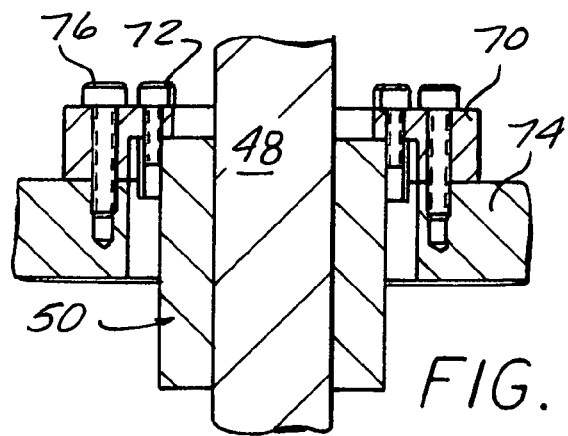
FIG. 9A is a further enlarged view of a fragmentary portion of the section shown in FIG. 9.

Referring to the drawings, and particularly FIGS. 1-3, a plug assist arrangement 10 utilizing the so called "third" platen actuation is shown.

An array of plug assists 12 (only one shown in FIG. 3) are recessed into corresponding wells 14 in an upper section 16 of a tooling structure 18 mounted on the lower platen 36 of a thermoforming press.

The lower end of each plug assist 12 is connected to a corresponding actuator shaft 20, which in turn are all held on a third platen 22 disposed in a cavity 24 of a lower section 26 of the tooling structure 18.

Platen 22 is connected to four shafts 28 extending down to a plug assist drive assembly 30 according to the present invention mounted to the lower underside of the press lower platen 36 which drive assembly 30 is used to advance the plug assists 12 into aligned mold cavities (not shown) when thermoforming sheets of plastics advanced over the tooling structure 18 and clamped against the mold cavities by movement of the press lower platen 36 in the manner well known in the art.

The plug assist drive assembly 30 includes four combination guide and drive rods 32 each connected to a respective shaft 28 as with a Segen coupling to move together therewith. The shafts 28 pass into the lower section of 26 tooling structure 18.

The guide-drive rods 32 are received in the interior space within a housing 38 included in the plug assist drive assembly 30.

Figure 8:
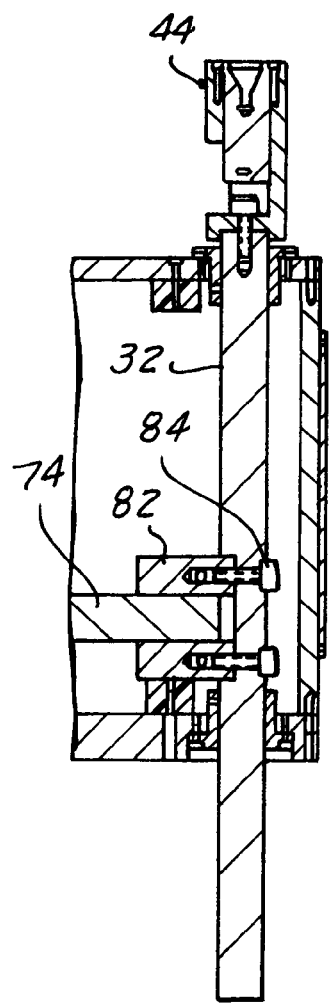
FIG. 8 is a view of the section 8-8 taken in FIG. 6.

The upper end 42 of each of the guide drive rods 32 is connected to a coupling 44 such as commercially available segen lock couplings affixed thereto (FIG. 8) which provide a quick connection to shafts 28 to connect the guide-drive rods 32 to the platen 22. The couplings 44 are received in cavities in the lower platen 36 (FIG. 3).

A roller screw assembly 46 is centrally mounted in the housing 38, including a screw shaft 48 and roller nut 50 shown in outline only. Roller screws are well known devices including a series of threaded planetary roller screws (not shown) mounted within the roller nut which engage the threaded screw shaft 48. The screw shaft 48 is rotated by an electrical servo motor 52 mounted to the housing 38 on brackets 54.

A motor output shaft sheave 56 and screw shaft sheave 58 held with a tapered sleeve 59 are interconnected with a drive belt 60 shown in phantom lines.

The screw shaft 48 is rotatably mounted at its lower end with four antifriction bearings 62, three of which are installed to be particularly oriented to support the heavier downward loads, and one bearing 62 reversed to be oriented to absorb the lighter upward load exerted by the nut 50 when moving up and down in response to rotation of the screw shaft 48 in either direction.

The bearings 62 are held in a main bearing housing 64 detachably secured against the underside of a heavy bottom plate 66 forming a bottom wall of the housing 38 with screws 68.

The upper end of the screw shaft 48 is held in a bearing 49 in the housing top plate 47. The roller screw nut 50 is held against the underside of hub adapter 78 with screws 72 with the hub adapter 70 in turn secured to the drive platen 74 with screws 76.

The drive platen 74 has a large hole 78 formed therein accommodating the nut 50 while the bottom plate 66 has a hole 80 so that upon removal of the screws 68 and 72, the entire roller screw 46 can be removed by being lowered down through the holes 78, 80.

The drive platen 74 is held to the guide-drive rods 32 by pairs of blocks 82 straddling and gripping the outer perimeter of the drive platen 74, the blocks 82 attached to the sides of each guide-drive rod 32 with screws 84 and to the drive platen 74.

The housing 38 is completed with pairs of side plates 86, 88. The side plates 86 each have access openings covered with removable covers 90 to enable access to the interior of housing 38.

Each of the guide-drive rods 32 are machined along their length to slide within widely separated support bearings 92, 94 mounted in the housing bottom plate 66 and top plate 47. Stop cushions 96, 98 are mounted to the inside of the bottom plate 66 and top plate 47.

Accordingly, the plug drive assembly 30 is simpler and much more compact than the prior designs described while allowing an enclosure of the moving components to be provided to achieve the objects of the invention.

The invention claimed is:

1. In combination with a thermoforming press, a plug assist drive assembly for advancing and retracting tooling structure including a plurality of a plug assists mounted on a third platen, said plug assist drive mounted to a thermoforming press platen, and including a housing including a top and a bottom plate, a roller screw assembly including a screw shaft and a roller screw nut received on said screw shaft, said screw shaft mounted extending within said housing;

a plug assist drive platen connected to said nut to be movable therewith within said housing upon rotation of said screw shaft;

a plurality of guide-drive rods connected to said drive platen, each of said guide-drive rods having upper and lower ends protruding through respective bearings mounted to each of said housing top and bottom plates respectively said guide-drive rods drivingly connected to said third platen; and a servo motor having an output shaft drivingly connected to said screw shaft for rotating the same.

2. The combination according to claim 1 wherein said screw shaft has an upper end received in a bearing mounted to said top plate, and a lower end received in a bearing mounted in said bottom plate.

3. The combination according to claim 1 wherein each guide-drive rod is clamped to an edge of said drive platen by pairs of blocks affixed to the side of each guide-drive rod.

4. The combination according to claim 1 wherein said roller screw nut is affixed to said drive platen by downwardly extending screws extending through an annular hub affixed with respect to said platen and said screw shaft extending upwardly through a hole in said hub, and wherein said screw shaft is supported by a set of bearings received in a bearing housing affixed to an underside of said bottom plate with screws, said bottom plate having a hole sized to allow said roller screw nut to pass downwardly therethrough, whereby upon loosening of said screws, said roller screw assembly can be lowered through said hole.

5. The combination according to claim 2 wherein said housing substantially encloses said roller screw assembly.

6. The combination according to claim 5 wherein said housing has side plates extending between said top and bottom plates.

7. The combination according to claim 6 wherein at least one of said side plates has a sidewall cover mounted over an access opening in said at least one side plate.

8. The combination according to claim 4 wherein said screw shaft has a lower end protruding through said bottom plate, and is supported by a plurality of antifriction bearings received over said end and in said housing, a majority of said bearings reversely oriented to support downward loads exerted thereon by said screw shaft end.

9. The combination according to claim 1 wherein said guide-drive rods are each connected to said third platen by a quick connect coupling.

10. The combination according to claim 1 wherein said guide-drive rods extend through said press platen into a tooling structure including said third platen and plug assists, said tooling structure mounted atop said press platen with said plug assist drive mounted on the underside of said press platen.

* * * * *